Figure 1:
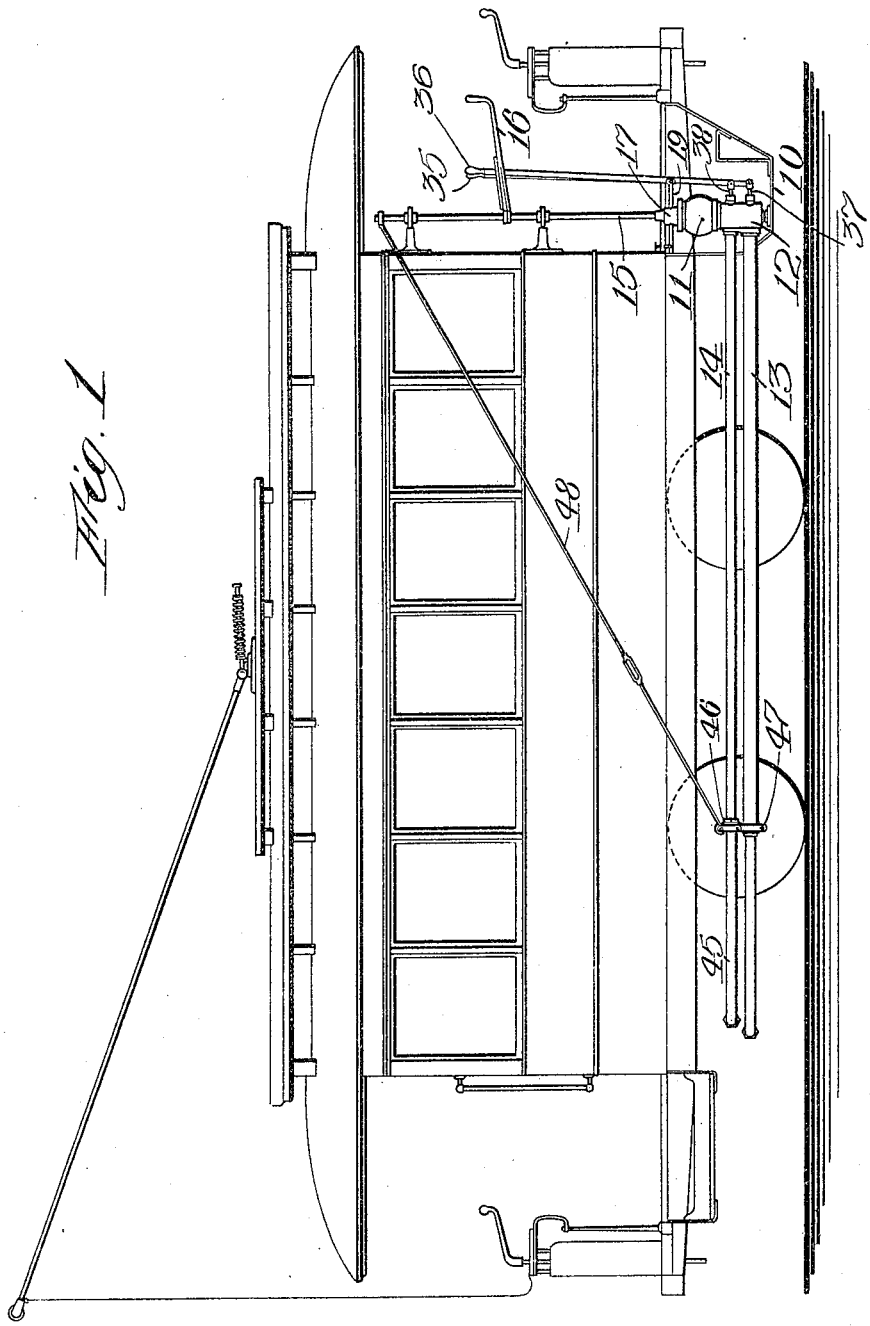

E. C. PERRY.
CAR SPRINKLER VALVE.
APPLICATION FILED JULY 22, 1908.

942,974.

Patented Dec. 14, 1909.
2 SHEETS—SHEET 1.

Witnesses:
C. F. Wesson
C. J. Hartnett

Inventor:
E. C. Perry
Attorneys
Southgate & Southgate

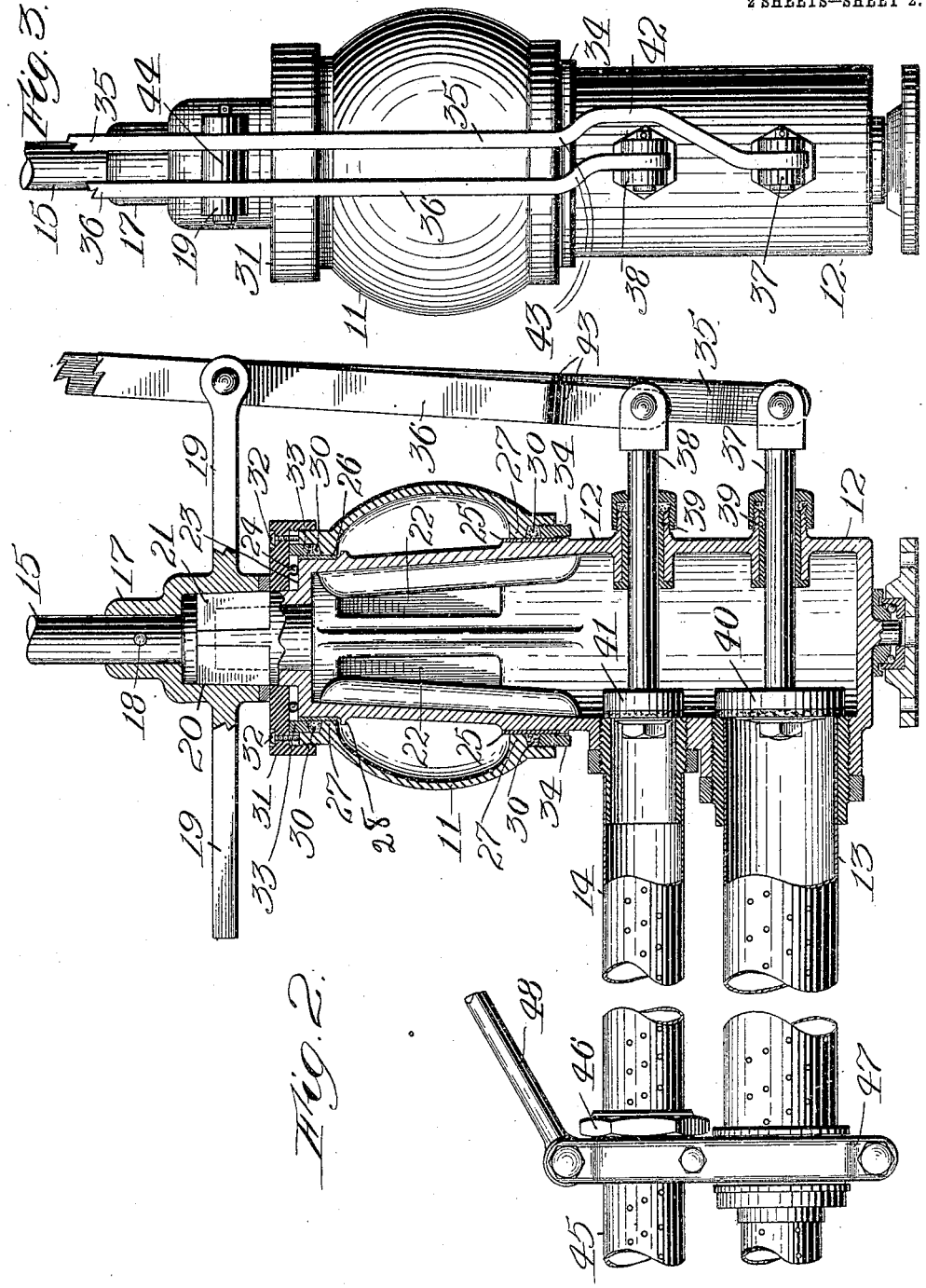

UNITED STATES PATENT OFFICE.

EDWARD C. PERRY, OF WORCESTER, MASSACHUSETTS, ASSIGNOR TO AMERICAN CAR SPRINKLER COMPANY, OF WORCESTER, MASSACHUSETTS, A CORPORATION OF MASSACHUSETTS.

CAR-SPRINKLER VALVE.

942,974.

Specification of Letters Patent.   Patented Dec. 14, 1909.

Application filed July 22, 1908.   Serial No. 444,761.

*To all whom it may concern:*

Be it known that I, EDWARD C. PERRY, a citizen of the United States, residing at Worcester, in the county of Worcester and State of Massachusetts, have invented a new and useful Car-Sprinkler Valve, of which the following is a specification.

This invention relates to a car sprinkler valve construction.

The principal objects of the invention are to provide for a simplified construction whereby the expense of manufacture may be greatly reduced; to provide improved features whereby the valves of the device can be more easily manipulated; to provide means whereby the adjustment of the fixed valve casing with respect to the inner or oscillating casing can be accomplished within wide limits and in a simple and convenient manner; to provide an improved and simplified construction of socket for turning the inner casing and of bearing surfaces, whereby packing can be placed in a position to act with more efficiency; and generally to improve and simplify the construction of a valve of this character.

Reference is to be had to the accompanying drawings, in which—

Figure 1 is a side view of a street sprinkler car showing this invention as applied thereto; Fig. 2 is a sectional view of the valve construction on an enlarged scale; and Fig. 3 is an end view of the same.

The invention is shown as mounted in the usual way on a car being carried by a supporting bracket 10 having a suitable bearing, and comprising an outer fixed casing 11 and an inner or lower casing 12. The lower casing carries the spray pipes 13 and 14, and is adapted to be turned by means of a rod 15 supported in suitable bearings, and having a lever 16 thereon for operating it.

The connection which has heretofore usually been made between the rod 15 and the casing 12 has been of a complicated nature, requiring screw-threads and some adjustment. According to the present invention the rod is simply shrunk into a hub 17 and additionally secured by a pin 18. This hub is made in an integral piece with a cross bar 19, the purpose of which is well understood. In the hub is a socket 20 which is preferably square or other non-circular shape, and the casing 12 is provided with a projection 21 of a similar shape extending into it. The casing 12 is provided with perforations 22 inside the casing 11, as is well understood, and has a shoulder 23 which is provided with ball bearings 24 to permit the turning of the casing 12 by means of the lever 16 without undue friction.

In the constructions heretofore usually used, it has been thought necessary to use an entire brass valve casing 12, and to provide bearing surfaces between it and the casing 11 of a conical form which require frequent repair, and afford no adequate place for packing. In the present case the casing 12 is preferably made of malleable cast iron and it is provided with long vertical cylindrical brass bearings 25 and 26. The upper one is smaller than the lower one, so that the larger one of two internal annular projections 27 on the casing 11, which are provided with bearing surfaces for engaging the brass bearing surfaces on the malleable iron casing, may slip down over it into proper position when the parts are assembled. On the casing 12 is a projection 28 for limiting the relative axial motion of the two casings by engaging the upper ring 27.

The inwardly projecting form of the annular rings 27 should be observed as the shape is such as to permit the use of vertical cylindrical bearing surfaces on both of the members, and at both ends thereof which allows a long vertical adjustment to take up wear. They also are of such shape as to permit a packing 30 to be placed bearing directly on the bearing surface 25 or 26, and also engaging the outside of the annular ring 27. Not only this, but they permit the use of means outside the packing ring for holding it securely in position. At the top of the casing this means is shown in the form of a cap 31 which can be adjusted by screw threads on the outer casing 11. This cap is provided with screws 32 bearing on the top of the upper flange of this casing and bears on a projecting ring 33 for engaging the packing. At the bottom the packing is held in by a screw threaded ring 34 entering the flange in the bottom of the outer casing and bearing on the bearing member 25. This is preferably made in the form of a two-part ring so that it can be readily inserted and taken out.

The cross bar 19 is designed to support a pair of substantially parallel levers 35 and 36 which extend upwardly so that both of them are near the end of the handle 16, so that the operator can control all of the levers in a convenient manner without changing his position. The bottoms of the levers 35 and 36 are connected with a pair of parallel sliding rods 37 and 38 respectively, which pass through the tight packing rings 39, or the like, into the interior of the cylinder 12. These rods pass diametrically and horizontally through this cylinder and support a pair of valves 40 and 41. The valve 40 bears on the end of the distributing pipe 13 and controls the supply of water thereto as will be readily understood. The valve 41 bears on the end of the distributing pipe 14 and controls the supply of water thereto. It has been known heretofore that a valve could be operated across the oscillating cylinder in the manner shown at the bottom of Fig. 2, but heretofore the second or upper pipe 14 has been controlled by a valve out at the left which prevented the placing of perforations in the pipe for a distance of about twelve inches from the center of the valve 12. This valve which is used in this place has been of an expensive construction, but heretofore it has been thought that it could not be done away with.

By the simple arrangement of placing a flat valve at the end of the pipe 14 the use of an extra valve out on the pipe is avoided, and the perforations for the passage of water are brought up to within about four inches of the center of the valve casing.

On account of the presence of the valve which is thus displaced, the sprinkling carts heretofore in use have been entirely unable to water the entire street, and they have always necessarily left a dry streak. By this simple construction I am enabled to water practically the entire street without any appreciable dry streak along it. At the same time, I am enabled to place the operating means for the two valves 40 and 41 in such a position that the handles of both are within easy reach of the operator and may be controlled by him without necessitating his moving out of position. As both handles are moved in the same way for opening their respective valves, it is obvious that the operator is less liable to make a mistake in operating them than he would if he had to keep two entirely different operations in mind. These features are important in this art as these cars run at a rather high rate of speed and it is often necessary to shut off the water suddenly to avoid wetting a passerby. With this invention this may be done simply by pulling adjacent handles in exactly the same way or by pulling one of them if only one sprinkler pipe is being used, to a position by the side of the other. This obviously is easier and simpler than to have two differently operating levers to manipulate. At the same time the two levers are supported by the cross bar 19. In order to accomplish this, and leave the two rods 37 and 38 exactly diametrical, the lever 35 is turned outwardly to form a bend 42 to pass the rod 36 and its connection with the lever 38. Both levers are then provided with bends 43 to bring them at the same distance from the center line of the rods 37 and 38. They pass upwardly in parallelism and the cross bar 19 is provided with a spacing piece 44 for holding them a proper distance apart. The end 45 of the pipe 14 is also made removable so that when it gets jammed up from contact with vehicles and the like, it may be removed from the main part without taking the entire pipe down. This is accomplished by placing a union 46 on the inner side of a strap 47 which is connected with the tie rod 48 which supports the outer ends of the two pipes.

While I have illustrated and described a preferred embodiment of the invention, I am aware that many modifications may be made therein by any person skilled in the art without departing from the scope of the invention as expressed in the claims. Therefore I do not wish to be limited to all the details of construction shown herein, but What I do claim is:—

1. In a street sprinkler valve construction, the combination of a casing mounted to turn, a main outlet pipe mounted thereon, a second outlet pipe adjacent to the main outlet pipe, a valve in said casing for the main outlet pipe, a valve in said casing for the second outlet pipe, a rod fixed to each valve, said rods being parallel and one being vertically above the other, a bearing for each rod, said bearings being opposite the pipes, and two vertical parallel levers for operating the two rods, said levers being disposed on opposite sides of the plane of said rods and being supported at a single point to turn with the casing.

2. In a street sprinkler valve construction, the combination of a casing mounted to turn, a main outlet pipe mounted thereon, a second outlet pipe adjacent to the main outlet pipe, a valve in said casing for the main outlet pipe, a valve in said casing for the second outlet pipe, a rod for each valve, said rods being parallel, a bearing for each rod, said bearings being opposite the pipes, and means for operating the two rods, said means being supported at a single point to turn with the casing, said means comprising two vertical levers, the one connected with the lower rod having a bend where it passes the upper rod, and both extending upwardly parallel with each other at equal distances from the centers of said rods.

3. In a street sprinkler valve construction, the combination of a casing mounted to turn, a main outlet pipe mounted thereon, a second outlet pipe adjacent to the main outlet pipe, a valve in said casing for the main outlet pipe, a valve in said casing for the second outlet pipe, a rod fixed to each valve and passing through the casing, a pair of levers, one for operating each of said valves, a cross bar at the top of the casing and turning therewith, said levers being pivotally mounted on said cross bar, said cross bar having an integral hub provided with a non-circular socket, and the casing having a projection thereon fitting the socket, and means positively secured to the hub for turning the hub, levers, and casing.

4. The combination with a valve casing having two annular inwardly extending bearings, one larger than the other, of an inner casing adapted to turn with respect to the outer casing and having long vertical cylindrical bearing surfaces engaging the bearing surfaces on the outer casing whereby one casing may be adjusted along the other, packing rings outside said bearing surfaces, means for holding said packing rings in position, and a projection on the inner casing for limiting the downward motion of the outer casing.

5. The combination with an outer valve casing having two inwardly extending annular projections provided with cylindrical bearing surfaces, of an inner perforated casing having longer cylindrical bearing surfaces fitting the bearing surfaces on the outer casing, means for holding packings in contact with the outside of the bearing surfaces on the inner casing, and with the outer edges of the bearing surfaces on the outer casing, a cap fitting the top of the outer casing, ball-bearings between the cap and the top of the inner casing, and means for adjusting the outer casing with respect to said cap.

In testimony whereof I have hereunto set my hand, in the presence of two subscribing witnesses.

EDWARD C. PERRY.

Witnesses:
    Louis W. Southgate,
    C. Forrest Wesson.